United States Patent
Ono et al.

(10) Patent No.: US 10,965,375 B2
(45) Date of Patent: Mar. 30, 2021

(54) OPTICAL NODE DEVICE

(71) Applicant: NIPPON TELEGRAPH AND TELEPHONE CORPORATION, Tokyo (JP)

(72) Inventors: Hirotaka Ono, Musashino (JP); Kazunori Senoo, Musashino (JP); Kenya Suzuki, Musashino (JP); Keita Yamaguchi, Musashino (JP); Mitsunori Fukutoku, Musashino (JP); Shingo Kawai, Musashino (JP); Yutaka Miyamoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/967,691

(22) PCT Filed: Feb. 8, 2019

(86) PCT No.: PCT/JP2019/004648
§ 371 (c)(1),
(2) Date: Aug. 5, 2020

(87) PCT Pub. No.: WO2019/156218
PCT Pub. Date: Aug. 15, 2019

(65) Prior Publication Data
US 2021/0036781 A1 Feb. 4, 2021

(30) Foreign Application Priority Data

Feb. 8, 2018 (JP) ............................. JP2018-021429

(51) Int. Cl.
| | |
|---|---|
| *H04B 10/29* | (2013.01) |
| *H04B 10/294* | (2013.01) |
| *G02B 6/02* | (2006.01) |
| *H04J 14/04* | (2006.01) |
| *H04B 10/2581* | (2013.01) |

(52) U.S. Cl.
CPC ....... *H04B 10/294* (2013.01); *G02B 6/02042* (2013.01); *H04B 10/2581* (2013.01); *H04B 10/29* (2013.01); *H04J 14/04* (2013.01)

(58) Field of Classification Search
CPC .. H04B 10/294; H04B 10/29; H04B 10/2581; H04J 14/04; G02B 6/02042; G02B 6/02;
(Continued)

(56) References Cited

U.S. PATENT DOCUMENTS

2002/0021463 A1* 2/2002 Turner ................ H04J 14/0221
398/79
2003/0058497 A1* 3/2003 Park ................... H04Q 11/0005
398/82

(Continued)

OTHER PUBLICATIONS

Y. Mimura et al. "Batch multicore amplification with cladding-pumped multicore EDF." Proc. ECOC2012. Sep. 16, 2012.
(Continued)

*Primary Examiner* — Dibson J Sanchez
(74) *Attorney, Agent, or Firm* — Harness, Dickey & Pierce, P.L.C.

(57) ABSTRACT

An optical node device includes: a multicore optical amplification unit that amplifies collectively light transmitted along a multicore fiber; a separation unit that inputs the amplified light in each core to each of a plurality of input-side single-core fibers; an optical cross-connect switch that attenuates the light input from each of the plurality of input-side single-core fibers through an optical attenuator, separates the light in accordance with a wavelength, and outputs the separated light to an output-side single-core fiber of a plurality of output-side single-core fibers related to a respective output destination; a plurality of single-core optical amplification units that amplify the light transmitted along the corresponding output-side single-core fibers; and an output unit that outputs the light transmitted along each
(Continued)

of the plurality of output-side single-core fibers to a multi-core fiber. A control unit controls the optical attenuator and the single-core optical amplification unit based on input signal optical power and output optical signal power.

7 Claims, 12 Drawing Sheets

(58) Field of Classification Search
CPC ... G02F 1/01; G02F 1/31; H01S 3/067; H01S 3/10
USPC .................. 398/43–103, 140–172, 173–181
See application file for complete search history.

(56) References Cited

U.S. PATENT DOCUMENTS

| | | | | |
|---|---|---|---|---|
| 2003/0099475 | A1* | 5/2003 | Nemoto | H04J 14/0245 398/83 |
| 2006/0039705 | A1* | 2/2006 | Goodwill | H04B 10/801 398/164 |
| 2008/0285973 | A1* | 11/2008 | Uchiyama | H04J 14/0212 398/83 |
| 2009/0290870 | A1* | 11/2009 | Koyano | H04B 10/07955 398/25 |
| 2010/0158532 | A1* | 6/2010 | Goto | H04B 10/2941 398/81 |
| 2013/0236175 | A1* | 9/2013 | Sethumadhavan | G02B 6/26 398/55 |
| 2014/0307304 | A1* | 10/2014 | Zhu | G02B 6/02371 359/341.3 |
| 2019/0140418 | A1* | 5/2019 | Le Taillandier de Gabory | H01S 3/094011 |

OTHER PUBLICATIONS

H. Ono et al. "Study on gain control of MC-EDFA by using hybrid pumping of cladding-and core-direct-pumping schemes." Science and Technology News, vol. 114, No. 451 (2015), p. 111-115. Machine translation attached.

* cited by examiner

OPTICAL NODE DEVICE

CROSS-REFERENCE TO RELATED APPLICATIONS

This application is a 371 U.S. National Phase of International Application No. PCT/JP2019/004648, filed on Feb. 8, 2019, which claims priority to Japanese Application No. 2018-021429, filed on Feb. 8, 2018. The entire disclosures of the above applications are incorporated herein by reference.

TECHNICAL FIELD

The present invention relates to an optical node device.

BACKGROUND ART

In order to drastically increase the transmission capacity of an optical transmission system, a multicore optical transmission system including a transmission path formed of a multicore optical fiber including a plurality of cores in one fiber has been developed. The respective cores of the multicore fiber propagate wavelength division multiplexing (WDM) signals transmitting different information; thus, as compared to the conventional case in which the transmission path is formed of one fiber including one core, the transmission capacity can be drastically increased.

Similarly to the conventional optical transmission system using the single-core fiber as the transmission path, the multicore optical transmission system for a long distance requires a multicore fiber amplifier in order to amplify the signal light because the intensity attenuates in the transmission. As an example of a structure of the multicore fiber amplifier, a cladding pumped multicore optical amplifier including a double-clad rare earth doped fiber and a high-output multimode excitation light source has been reported (for example, see Non-Patent Literature 1). The double-clad rare earth doped fiber includes a plurality of cores doped with a rare earth ion, and a double-clad structure (a first clad on the inside and a second clad on the outside). The refractive index of a first clad material is smaller than that of core glass and larger than that of a second clad material. By the multicore fiber amplifier with such a structure, the lower consumption lower is expected.

When the optical amplifier amplifies the WDM signal, a general WDM system needs gain control in order to obtain the gain with a constant wavelength dependence at any time despite the increase or decrease in WDM signal wavelength number. This similarly applies to a system including the multicore fiber. A cladding pumped multicore fiber amplifier is capable of amplification with fewer excitation light sources, and if a high-output multimode semiconductor laser (LD) is used, the number of excitation light sources may be one. However, since the number of excitation light sources is smaller than that of cores, it has been difficult to independently control the gain and the output optical power of the respective cores. In view of the above, a multicore optical fiber amplifier combining core pumping and clad pumping has been developed (for example, see Non-Patent Literature 2).

CITATION LIST

Non-Patent Literature

Non-Patent Literature 1: "Batch multicore amplification with cladding-pumped multicore EDF" by Y. Mimura and six others, Proc. ECOC2012, paper Tu.4.F.1., 2012.

Non-Patent Literature 2: "Study on gain control of MC-EDFA by using hybrid pumping of cladding- and coredirect-pumping schemes" by Hirotaka Ono and five others, IEICE technical report OCS2014-116, 2015, p. 111-115.

SUMMARY OF THE INVENTION

Technical Problem

The multicore optical fiber amplifier described in Non-Patent Literature 2 performs gain constant control. Therefore, depending on the change in input signal optical power per wavelength, the output signal optical power per wavelength in the multicore optical fiber amplifier output also changes. That is to say, if the input signal optical power per wavelength increases (decreases) by 5 dB, the output signal optical power per wavelength also increases (decreases) by 5 dB.

On the other hand, when the optical fiber amplifier is used for the optical node, the gain control for controlling the output signal optical power per wavelength to be constant even if the input signal optical power per wavelength is changed may be necessary. However, the multicore optical fiber amplifier that has been researched and developed performs just the gain constant control as described above, and it has been difficult to use such an amplifier for the optical node.

In view of the above, an object of the present invention is to provide an optical node device that can control the output signal optical power per single wavelength to be constant even if the input signal optical power per single wavelength is changed.

Means for Solving the Problem

One aspect of the present invention is an optical node device including: a multicore optical amplification unit that includes a multicore fiber and amplifies collectively light transmitted along a plurality of cores of the multicore fiber; a separation unit that inputs, to each of a plurality of input-side single-core fibers, the light transmitted along each of the plurality of cores of the multicore fiber; an optical cross-connect switch that attenuates individually the light input from each of the plurality of input-side single-core fibers through an optical attenuator, separates the light in accordance with a wavelength, and outputs the separated light to an output-side single-core fiber of a plurality of output-side single-core fibers related to a respective output destination of the separated light; a plurality of single-core optical amplification units that individually correspond to the plurality of output-side single-core fibers and amplify the light transmitted along the corresponding output-side single-core fibers; an output unit that outputs the light transmitted along each of the plurality of output-side single-core fibers to each of the plurality of cores in a transmission multicore fiber; and a control unit that controls the optical attenuator and the single-core optical amplification unit based on input signal optical power corresponding to optical power before amplification of the multicore optical amplification unit and output optical signal power corresponding to optical power after amplification of the single-core optical amplification unit.

One aspect of the present invention is the aforementioned optical node device in which the control unit controls the optical attenuator using an attenuation amount that is calculated based on the input signal optical power and a wavelength number of the light.

One aspect of the present invention is the aforementioned optical node device in which the control unit controls the optical attenuator using a result of performing correction of a gain tilt on the calculated attenuation amount based on the input signal optical power.

One aspect of the present invention is the aforementioned optical node device in which the control unit corrects, based on the input signal optical power, a target gain determined based on the wavelength number of the light, and controls the single-core optical amplification unit based on the corrected target gain, and a gain obtained based on the input signal optical power and the output optical signal power.

One aspect of the present invention is the aforementioned optical node device in which the control unit corrects the output optical signal power based on the input signal optical power, and controls the single-core optical amplification unit based on a gain that is calculated based on the input signal optical power and the corrected output optical signal power, and a target gain determined based on the wavelength number of the light.

One aspect of the present invention is the aforementioned optical node device in which the optical cross-connect switch includes a plurality of the optical attenuators that individually correspond to the plurality of input-side single-core fibers and attenuate the light input from the corresponding input-side single-core fibers, a plurality of input-side wavelength selection switches that individually correspond to the plurality of optical attenuators, separate the light attenuated by the corresponding optical attenuators for each wavelength, and output the separated light in accordance with output destinations of the light, and a plurality of output-side wavelength selection switches that individually correspond to the output destinations, multiplex the light output from the plurality of input-side wavelength selection switches in accordance with the corresponding output destinations, and output the light to the output-side single-core fibers related to the output destinations, and the control unit regulates the attenuation amount so that optical powers of wavelengths in the input-side wavelength selection switch and the output-side wavelength selection switch become the same.

One aspect of the present invention is the aforementioned optical node device in which the light has a wavelength of 1565 nm or more and 1625 nm or less, and the multicore fiber in the multicore optical amplification unit is a cladding-pumped erbium-doped fiber with an inner clad radius of more than 80 microns and 18 or less cores.

Effects of the Invention

According to the present invention, even if there is a change in the input signal optical power per single wavelength in the optical node device, the output signal optical power per single wavelength can be controlled to be constant.

DESCRIPTION OF EMBODIMENT

An embodiment of the present invention is hereinafter described in detail with reference to drawings. The present embodiment is related to an optical node device and optical power control in optical fiber communication.

Figure 1:
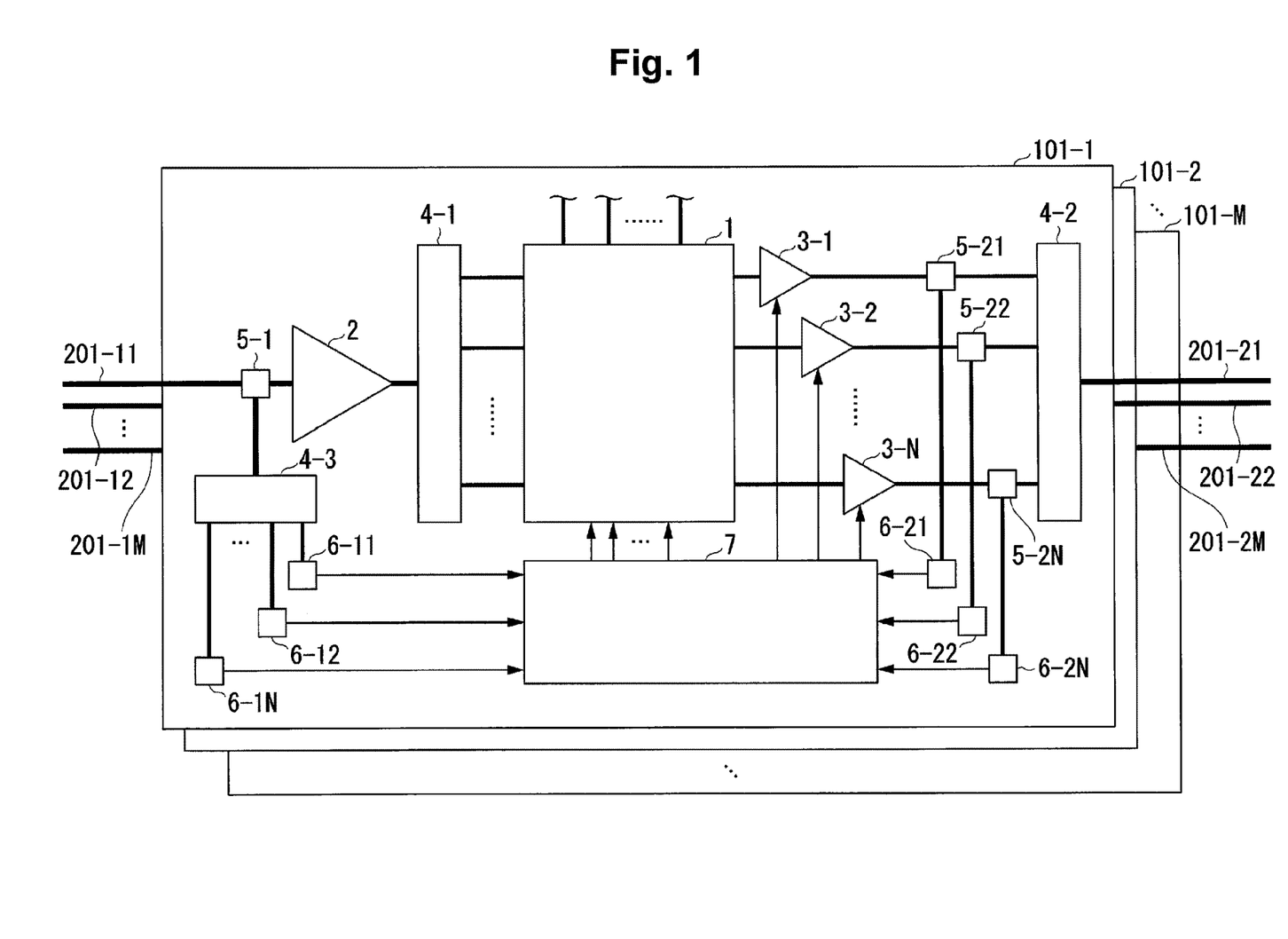
FIG. 1 is a block diagram illustrating a structure of optical node devices according to one embodiment of the present invention.

FIG. 1 is a block diagram illustrating a structure of optical node devices 101-1 to 101-M (M is an integer of 1 or more) according to one embodiment of the present invention. The optical node devices 101-1 to 101-M have a similar structure, and when the optical node devices 101-1 to 101-M are collectively referred to or when the optical node devices 101-1 to 101-M are not distinguished, the optical node devices 101-1 to 101-M are described as the optical node device 101. The optical node device 101-$m$ (m is an integer of 1 or more and M or less) receives light from a transmission multicore fiber 201-1$m$ including N (N is an integer of 2 or more) cores and outputs the light to a transmission multicore fiber 201-2$m$.

The optical node device 101 includes a cross-connect switch 1, a cladding pumped multicore optical amplifier 2, core pumped single-core optical amplifiers 3-1 to 3-N, fan-outs 4-1 to 4-3, optical dividers 5-1 and 5-21 to 5-2N, optical power detectors 6-11 to 6-1N and 6-21 to 6-2N, and a controller 7. The fan-outs 4-1 to 4-3 enable the conversion between the multicore fiber and the single-core fiber.

The optical divider 5-1 of the optical node device 101-$m$ divides the power of light received from the transmission multicore fiber 201-1$m$ and outputs the obtained power to a multicore fiber between the optical divider 5-1 and the cladding pumped multicore optical amplifier 2 and to a multicore fiber between the optical divider 5-1 and the fan-out 4-3. The cladding pumped multicore optical amplifier 2 amplifies the light received from the optical divider 5-1 and outputs the obtained light to a multicore fiber between the cladding pumped multicore optical amplifier 2 and the fan-out 4-1. The fan-out 4-1 outputs the light received from the N cores of the multicore fiber between the fan-out 4-1 and the optical divider 5-1 to the N single-core fibers. The cross-connect switch 1 receives the light output from the fan-out 4-1 through the N single-core fibers. The cross-connect switch 1 attenuates the light received through the respective single-core fibers in optical attenuators individually, and separate the attenuated light in accordance with the wavelengths. The cross-connect switch 1 outputs the separated light to the single-core fibers related to the output destinations of the light among the single-core fibers between the cross-connect switch 1 and the core pumped single-core optical amplifiers 3-1 to 3-N.

The core pumped single-core optical amplifiers 3-1 to 3-N receive the light output from the cross-connect switch 1 through the single-core fibers. The core pumped single-core optical amplifier 3-$n$ outputs the amplified light to the optical divider 5-2$n$. The optical divider 5-2$n$ divides the power of the light received from the core pumped single-core optical amplifier 3-$n$, and outputs the obtained power to the fan-out 4-2 and an optical power detector 6-2$n$. The fan-out 4-2 receives the light output from each of the optical dividers 5-21 to 5-2N through the single-core fibers. The fan-out 4-2 of the optical node device 101-$m$ inputs the light received from the N single-core fibers to the N cores in the transmission multicore fiber 201-2$m$.

The fan-out 4-3 inputs, to the N single-core fibers, the light received from the N cores in the multicore fiber between the fan-out 4-3 and the optical divider 5-1. The optical power detectors 6-11 to 6-1N receive the light output from the fan-out 4-3 through the single-core fibers. The optical power detectors 6-11 to 6-1N output signals expressing the result of detecting the input optical power to the controller 7. On the other hand, the optical power detector 6-2$n$ receives the light output from the optical divider 5-2$n$ through the single-core fiber. The optical power detectors 6-21 to 6-2N output signals expressing the result of detecting the input optical power to the controller 7. The controller 7 controls the cross-connect switch 1 and the core pumped single-core optical amplifiers 3-1 to 3-N based on the detection results from the optical power detectors 6-11 to 6-1N and 6-21 to 6-2N. Thus, the controller 7 can control the transmission gain in the optical node device 101.

Figure 2:
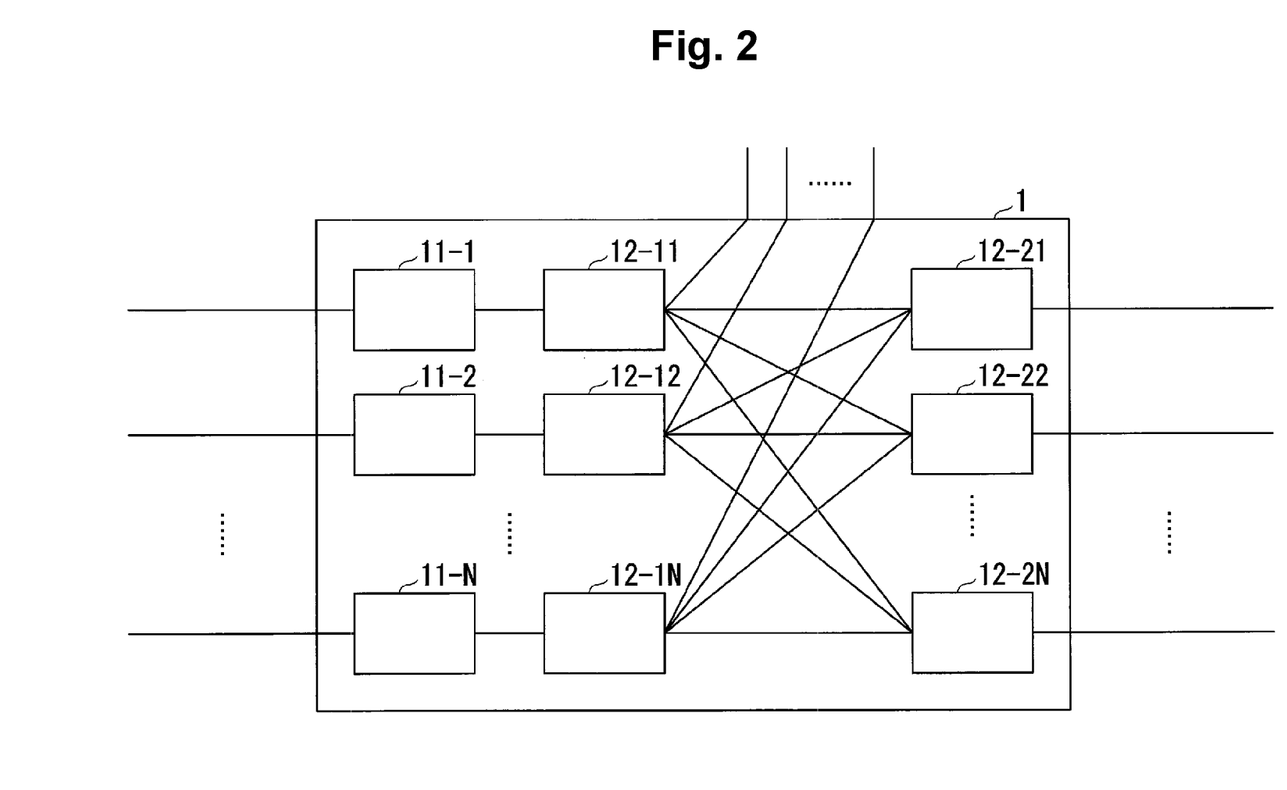
FIG. 2 is a block diagram illustrating a structure of a cross-connect switch according to the embodiment.

FIG. 2 is a block diagram illustrating a structure of the cross-connect switch 1 illustrated in FIG. 1. As illustrated in this drawing, the cross-connect switch 1 includes variable optical attenuators 11-1 to 11-N, and wavelength selection switches 12-11 to 12-1N and 12-21 to 12-2N. The variable optical attenuators 11-1 to 11-N receive the light output from the fan-out 4-1 through the single-core fibers. The variable optical attenuator 11-$n$ attenuates the received light in accordance with the control of the controller 7 and outputs the attenuated light to the wavelength selection switch 12-1$n$. The wavelength selection switch 12-1$n$ receives the light from the variable optical attenuator 11-$n$ and separates the light for each wavelength. The wavelength selection switches 12-11 to 12-1N output the separated light to the wavelength selection switches 12-21 to 12-2N and the like in accordance with the output destination of the light of each wavelength. The wavelength selection switch 12-2$n$ multiplexes the light received from the wavelength selection switches 12-11 to 12-1N, and output the obtained light to the core pumped single-core optical amplifier 3-$n$.

Figure 3:
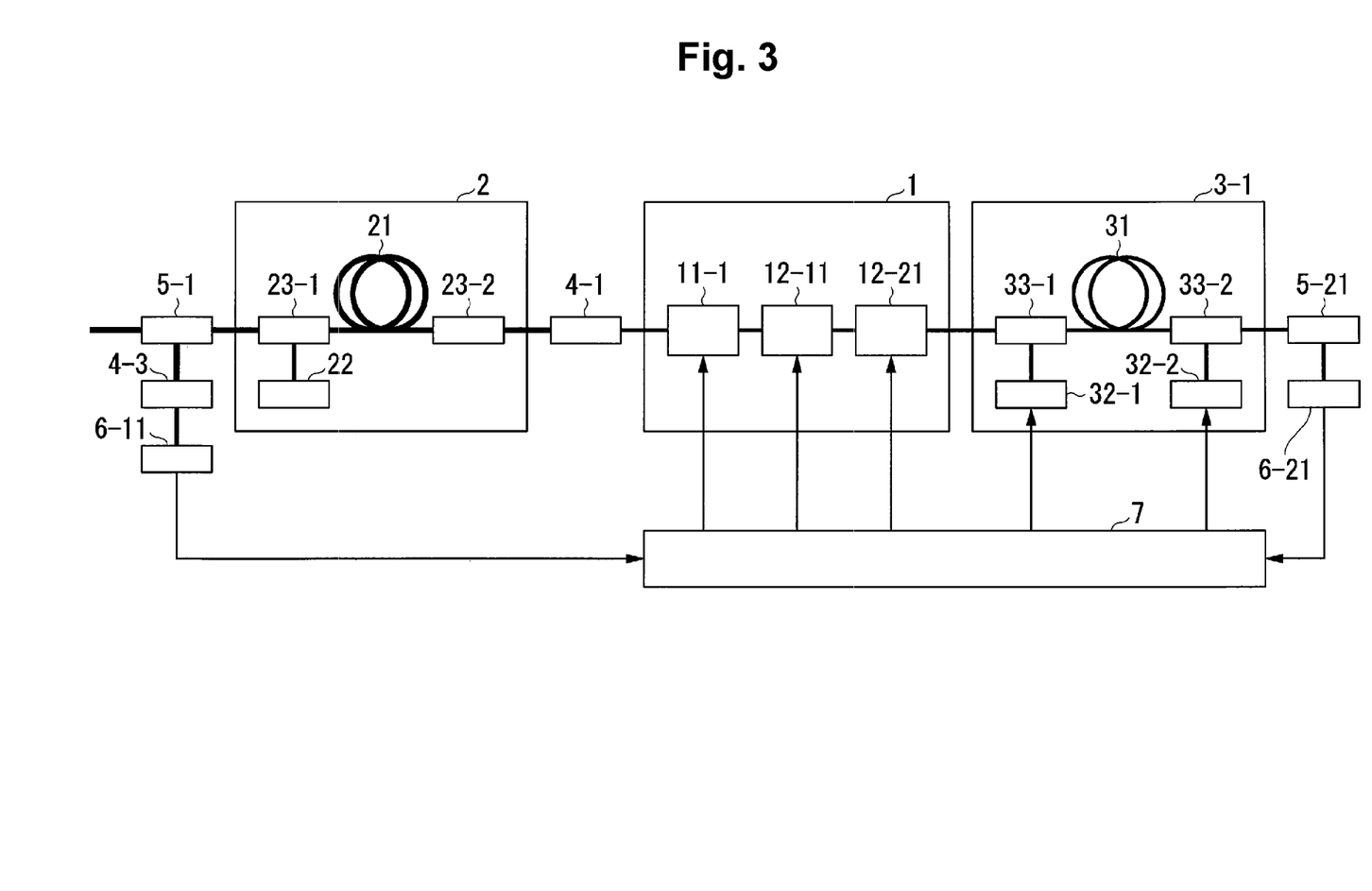
FIG. 3 is a diagram in which a part of routes in the optical node device according to the embodiment is extracted.

FIG. 3 is a diagram in which a part of routes in the optical node device 101-1 illustrated in FIG. 1 is extracted. This route includes the transmission multicore fiber 201-11, the cladding pumped multicore optical amplifier 2, the cross-connect switch 1, the core pumped single-core optical amplifier 3-1, and the transmission multicore fiber 201-21.

With reference to this drawing, the optical power control by the optical node device 101 according to the present embodiment is described.

The cladding pumped multicore optical amplifier 2 illustrated in this drawing includes a multicore fiber 21 for amplification, an excitation light source 22 for exciting active ions added to the multicore fiber 21 for amplification, and multiplexers/demultiplexers 23-1 and 23-2 for multiplexing or demultiplexing the excitation light and the signal light. The multicore fiber 21 is a double-clad six-core erbium doped fiber. The excitation light source 22 is a multimode 980-nm semiconductor laser (LD). The fibers of the multiplexers/demultiplexers 23-1 and 23-2 on the optical isolator side are the single-clad six-core fibers, the fibers of the multiplexers/demultiplexers 23-1 and 23-2 on the amplification multicore fiber side are the double-clad six-core fibers, and the fibers of the multiplexers/demultiplexers 23-1 and 23-2 on the excitation light source side are the single-clad multimode. The multiplexers/demultiplexers 23-1 and 23-2 have a function of combining the corresponding cores of both multicore fibers in a lens optical system and multiplexing the excitation light and the signal light with a dichroic mirror to combine into the multicore fiber. In addition, the multiplexers/demultiplexers 23-1 and 23-2 incorporate the optical isolator.

The core pumped single-core optical amplifier 3-1 illustrated in this drawing includes a single-core fiber 31 for amplification, excitation light sources 32-1 and 32-2 for exciting active ions added to the single-core fiber for amplification, and multiplexers/demultiplexers 33-1 and 33-2 for multiplexing and demultiplexing the excitation light and the signal light. In the present embodiment, the single-core fiber 31 is a single-core erbium doped fiber. The excitation light sources 32-1 and 32-2 are multimode 980-nm semiconductor lasers (LDs). A multiplexer/demultiplexer 33-$i$ ($i$=1, 2) multiplexes the signal light and the excitation light from an excitation light source 32-$i$. The multiplexers/demultiplexers 33-1 and 33-2 each employ a WDM fiber coupler, and have an optical isolator fused and connected thereto. As each of the multiplexers/demultiplexers 33-1 and 33-2, a bulk type WDM coupler formed of a dielectric multilayer filter and a lens may be used.

The optical power of the signal light input to the optical node device 101 and the signal light amplified and output is partially divided in the optical dividers 5-1 and 5-21. The signal optical power divided by the optical divider 5-1 is converted from the multicore to the single-core in the fan-out 4-3. The optical signal power converted to the single-core in the fan-out 4-3 and the signal optical power divided in the optical divider 5-21 are converted into electric signals (voltage values) corresponding to the optical power in the optical power detectors 6-11 and 6-21, respectively and the resulting electric signals are sent to the controller 7. These electric signals are the values corresponding to the input signal optical power and the output signal optical power by 1:1. The controller 7 regulates the attenuation amount in the variable optical attenuator 11-1 so that the amplification gain or the output signal optical power becomes a desired value by the calculation of these electric signals, or regulates the driving current of the single-mode 980-nm LD in the core pumped single-core optical amplifier 3-1 so as to increase or decrease the excitation optical power output from the 980-nm LD.

Figure 4:
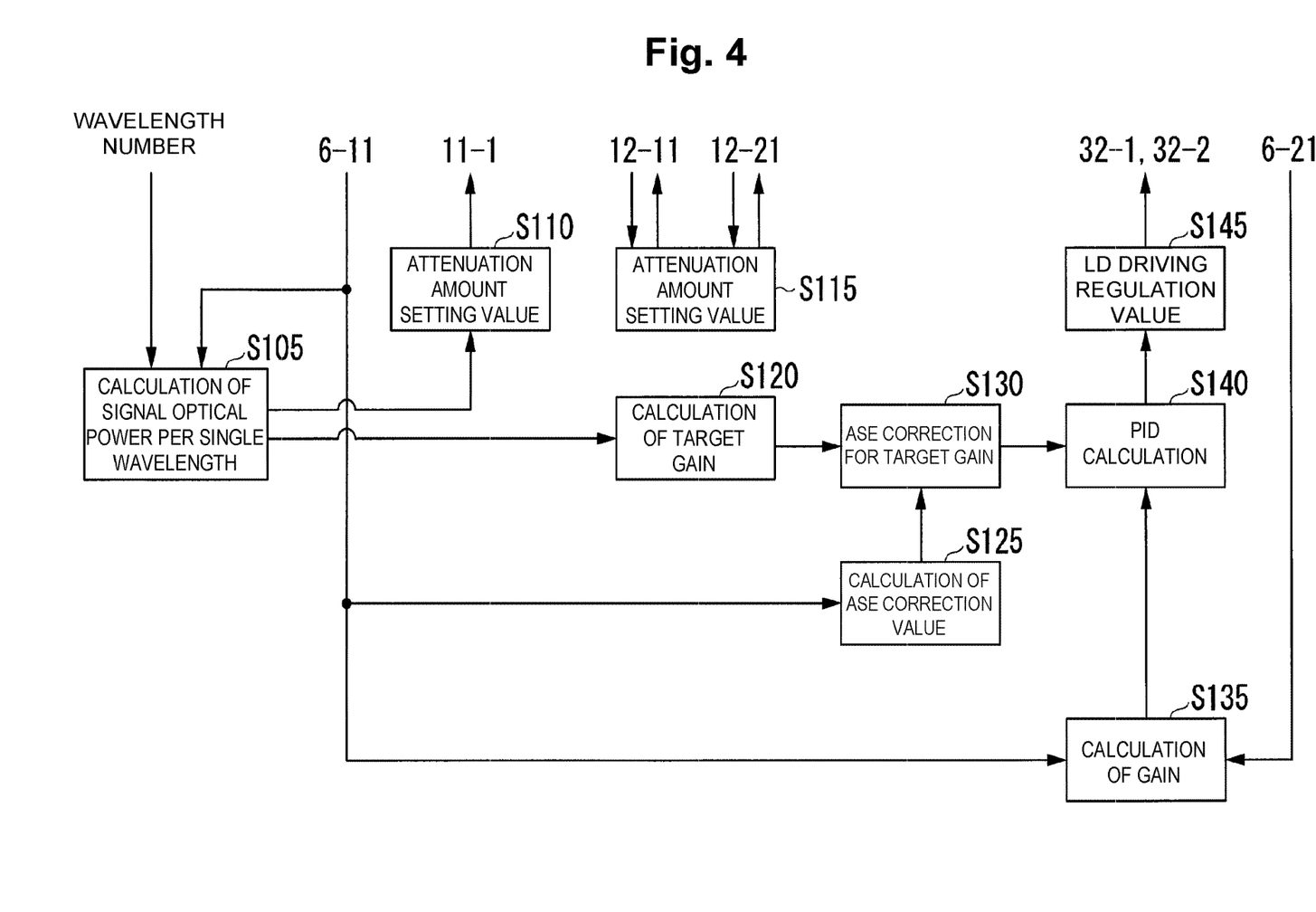
FIG. 4 is a diagram illustrating one example of the operation of a controller according to the embodiment.

FIG. 4 is a diagram illustrating one example of the operation of the controller 7. The controller 7 acquires the wavelength number information separately from a monitoring control channel (not shown). The controller 7 calculates the signal optical power per single wavelength based on the wavelength number information and the detection value in the optical power detector 6-11 (step S105). The controller 7 determines the attenuation amount setting value that is set in advance in the variable optical attenuators 11-1 to 11-N based on the signal optical power per single wavelength (step S110). For example, the controller 7 can determine the attenuation amount setting value based on the interpolation calculation and a lookup table in which the signal optical power and the attenuation amount setting value are associated with each other. In accordance with the determined attenuation amount setting value, the controller 7 regulates the attenuation amount of each of the variable optical attenuators 11-1 to 11-N. Each of the wavelength selection switches 12-11 and 12-21 includes means for detecting the optical power of each signal wavelength. The controller 7 regulates the attenuation amount in the wavelength selection switches 12-11 and 12-21 so that the signal wavelengths have the same optical power based on the detection result (step S115).

In addition, the controller 7 calculates the target gain based on the signal optical power per single wavelength (step S120) and calculates the amplified spontaneous emission (ASE) correction value based on the detection result from the optical power detector 6-11 (step S125). The controller 7 performs the ASE correction with the ASE correction value for the target gain and sets the target value of the PID calculation (step S130). The controller 7 calculates the gain based on the detection results from the optical power detectors 6-11 and 6-21 (step S135), and from the result of the PID calculation based on the deviation between the calculation result of the gain and the target value of the PID calculation (step S140), obtains the LD driving regulation value (step S145). The controller 7 controls the driving current of the single-mode 980-nm LD corresponding to each of the excitation light sources 32-1 and 32-2 in accordance with the obtained LD driving regulation value.

Figure 5:
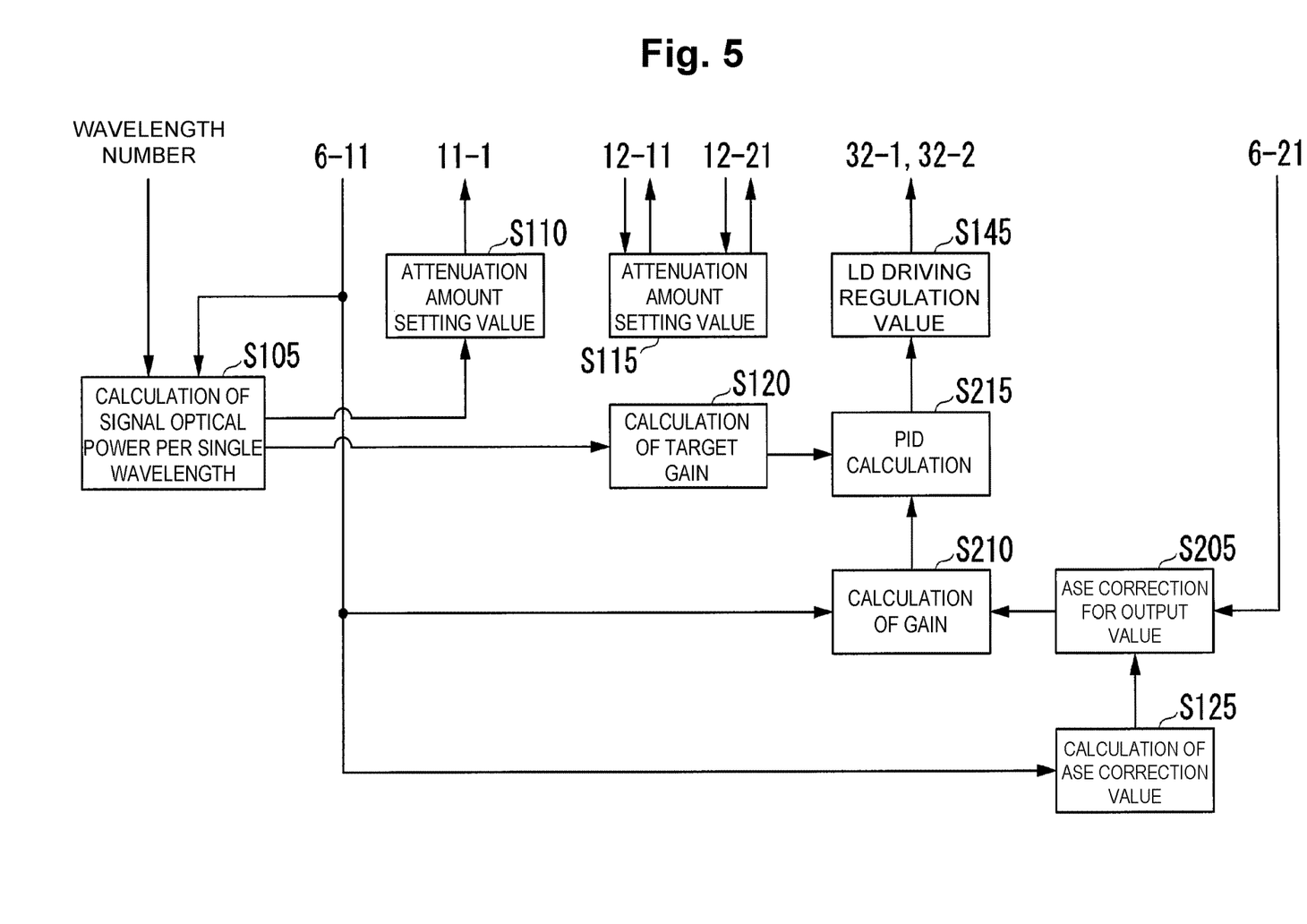
FIG. 5 is a diagram illustrating another example of the operation of the controller according to the embodiment.

FIG. 5 is a diagram illustrating another example of the operation of the controller 7. In this drawing, the same operation as that in FIG. 4 is denoted by the same reference sign. In FIG. 4, the ASE correction value calculated in step S125 is used for correcting the target gain; however, as illustrated in FIG. 5, the ASE correction value can be used for correcting the output value obtained from the optical power detector 6-21 (step S205). The controller 7 calculates the gain based on the result of performing the ASE correction on the detection value from the optical power detector 6-21 and the detection value of the optical power detector 6-11 (step S210). The controller 7 performs the PID calculation using the deviation between the target gain calculated in step S120 and the gain calculated in step S210 (step S215), and thus obtains the LD driving regulation value (step S145). The controller 7 regulates the driving current of the single-mode 980-nm LD in accordance with the LD driving regulation value.

Figure 6:
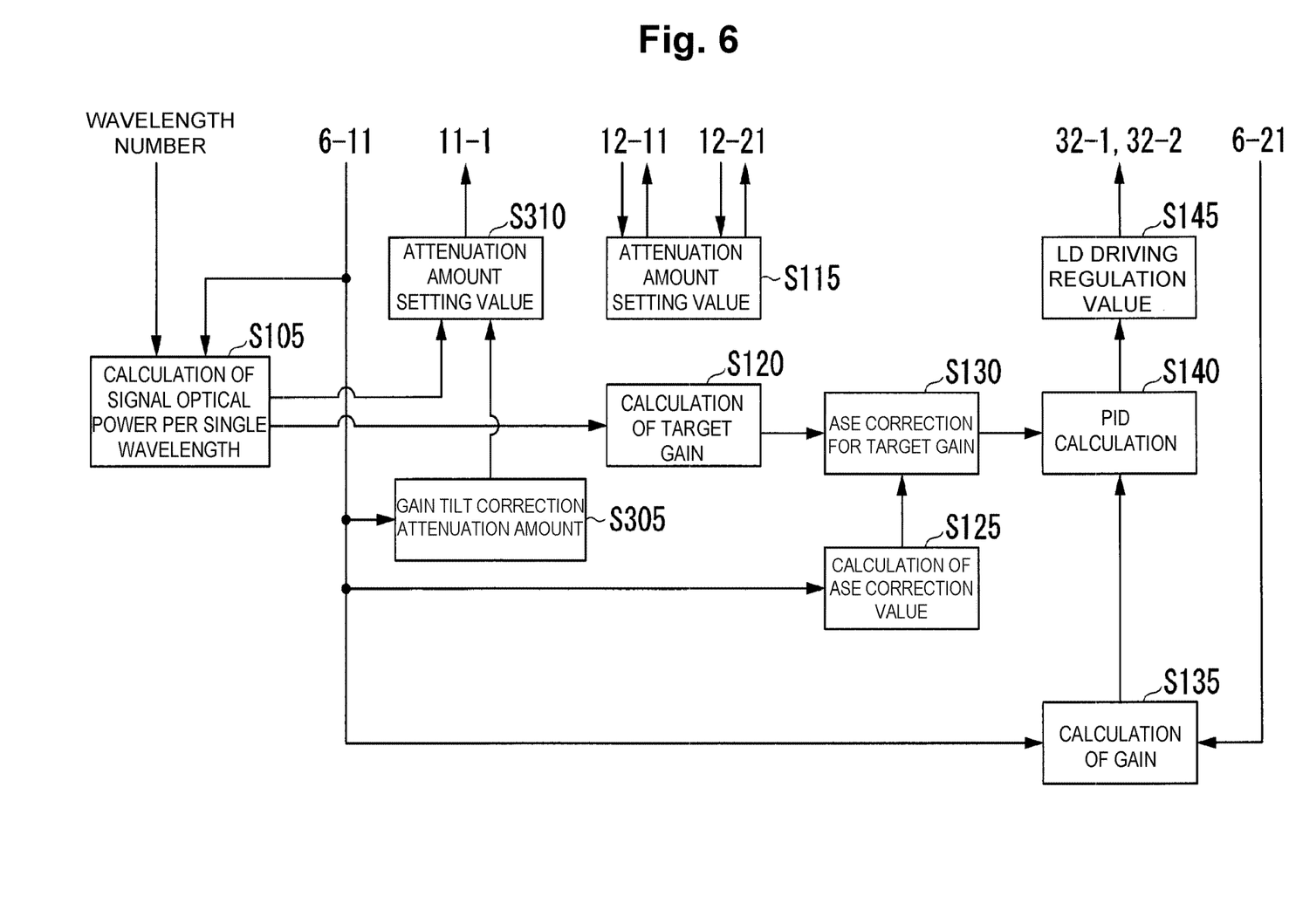
FIG. 6 is a diagram illustrating another example of the operation of the controller according to the embodiment.

FIG. 6 is a drawing illustrating another example of the operation of the controller 7. In this drawing, the same operation as that in FIG. 4 is denoted by the same reference sign. The controller 7 calculates the gain tilt correction attenuation amount based on the detection result from the optical power detector 6-11 so as to correct the gain tilt (tilt for the wavelength of the gain spectrum) (step S305). The controller 7 adds (or subtracts) the gain tilt correction attenuation amount to (or from) the attenuation amount setting value of VOA (variable optical attenuator) calculated similarly to step S110 (step S310). Thus, the gain control can be performed with higher accuracy.

Figure 7:
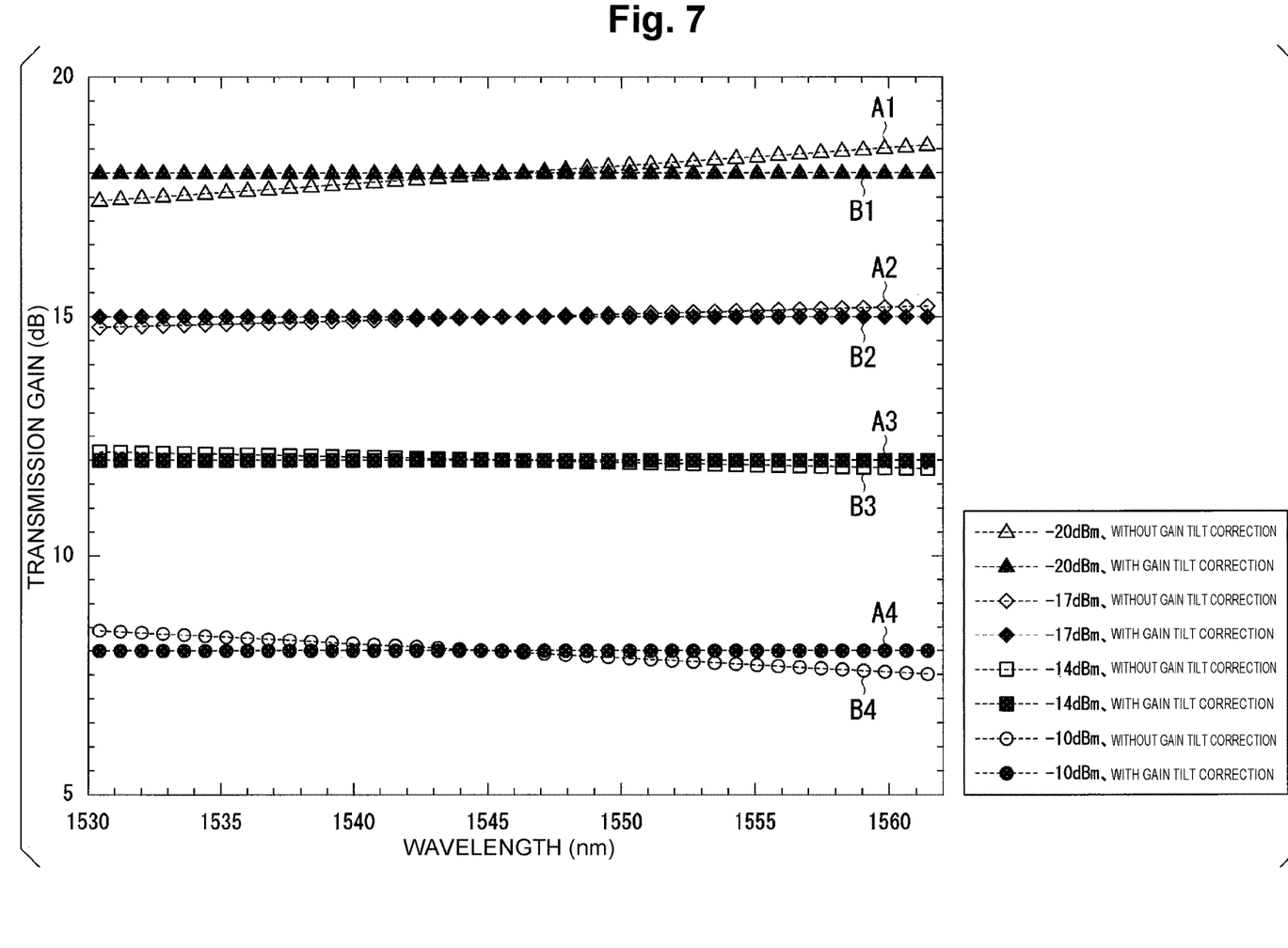
FIG. 7 is a diagram illustrating an example of the transmission gain spectrum of the optical node device according to the embodiment.
Figure 8:
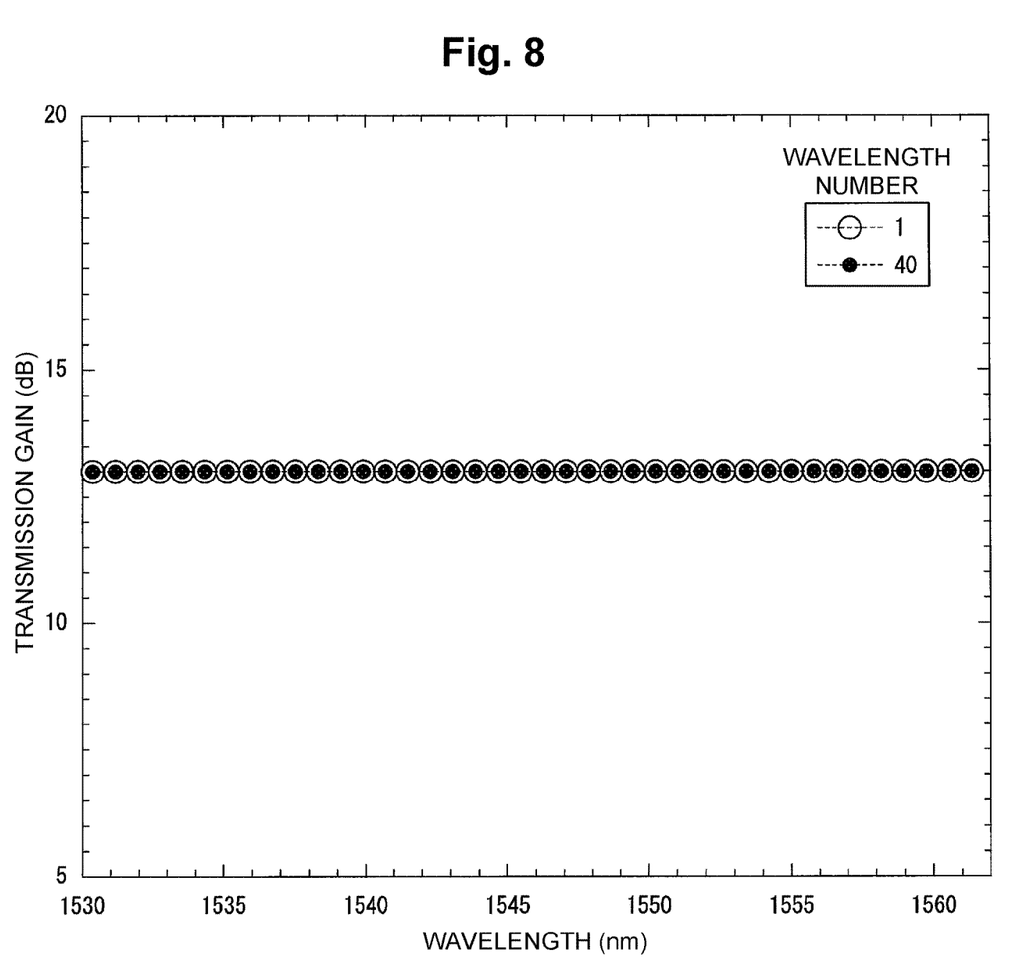
FIG. 8 is a diagram illustrating another example of the transmission gain spectrum of the optical node device according to the embodiment.

FIG. 7 and FIG. 8 are diagrams illustrating examples of the transmission gain spectrum of the optical node device 101 according to the present embodiment. FIG. 7 illustrates the control result when the input signal optical power per single wavelength of the WDM signal has changed from −10 dBm to −20 dBm. The input signal optical power per single wavelength is −20 dBm at A1 and B1, −17 dBm at A2 and B2, −14 dBm at A3 and B3, and −10 dBm at A4 and B4. The signs A1, A2, A3, and A4 correspond to the control without the gain tilt correction, and the signs B1, B2, B3, and B4 correspond to the control with the gain tilt correction. In either input signal optical power, a small gain tilt is left if there is no gain tilt control, but the output signal optical power from the optical node per single wavelength is controlled to be −2 dBm. With the gain tilt correction, the gain is controlled equally in the entire signal wavelengths.

FIG. 8 illustrates the transmission gain spectrum for the signal light inputs having different wavelength numbers of the WDM signal. A black circular mark expresses the gain value of each wavelength when the wavelength number is 40, and a white circular mark expresses the gain value at each wavelength when the wavelength number is 1. The drawing indicates that the gain value at each wavelength when the wavelength number is 1 is in the range of 0.2 dB or less with respect to the gain value when the wavelength number is 40. Thus, it is understood that even if the wavelength numbers of the WDM signal to be input are different, the multicore fiber optical amplifier according to the present embodiment is controlled so that the gain is substantially constant at the respective signal wavelengths.

Note that each optical node device 101 according to the present embodiment described above includes the core pumped single-core optical amplifiers 3-1 to 3-N; however, the same effect can also be obtained by using one core pumped multicore optical amplifier commonly in a plurality of optical node devices 101 instead of using the core pumped single-core optical amplifiers 3-1 to 3-N.

Incidentally, the optical node device 101 according to the present embodiment is applicable to both wavelength ranges of the C range (1530 to 1565 nm) and the L range (1565 to 1625 nm) as the WDM signal wavelength range. In the case of the L range, there is a limitation on the number of cores in the cladding pumped multicore optical amplifier 2 and the radius of the inner clad where the excitation light propagates in the multicore fiber 21 for the amplification.

Figure 9:
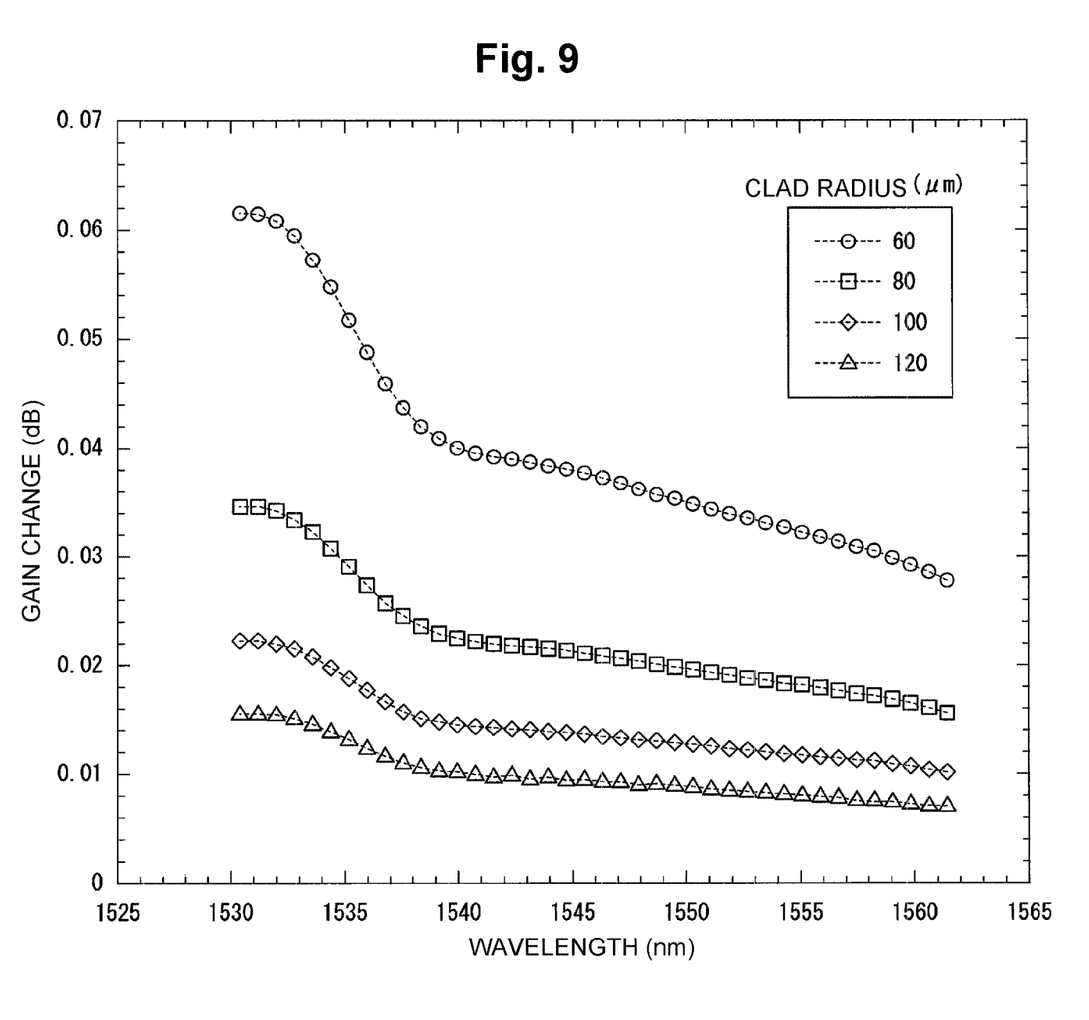
FIG. 9 is a diagram illustrating the gain change of cores in a cladding pumped multicore optical amplifier when the optical node device according to the embodiment is applied to the C range.
Figure 10:
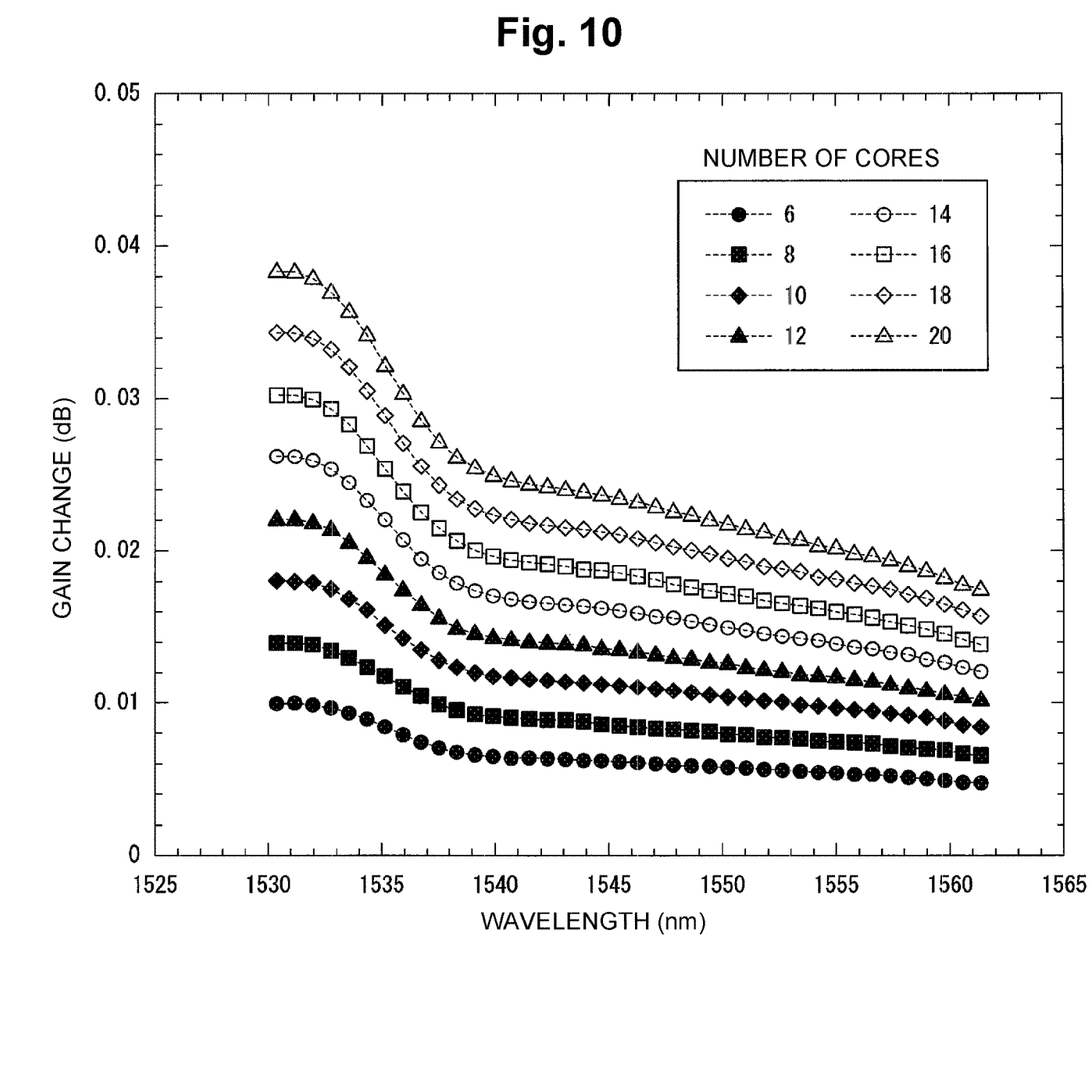
FIG. 10 is a diagram illustrating the gain change of cores in a cladding pumped multicore optical amplifier when the optical node device according to the embodiment is applied to the C range.

FIG. 9 and FIG. 10 are diagrams each illustrating the gain change of the cores in the cladding pumped multicore optical amplifier 2 when the optical node device 101 according to the present embodiment is applied to the C range. These drawings express that, assuming that one core of the cladding pumped multicore optical amplifier 2 in the C range is focused, the inner clad radius dependence (FIG. 9) and the core number dependence (FIG. 10) of the gain change of the focused core when all the WDM signal wavelength numbers to be input to the other cores are changed to 40 to 1.

Figure 11:
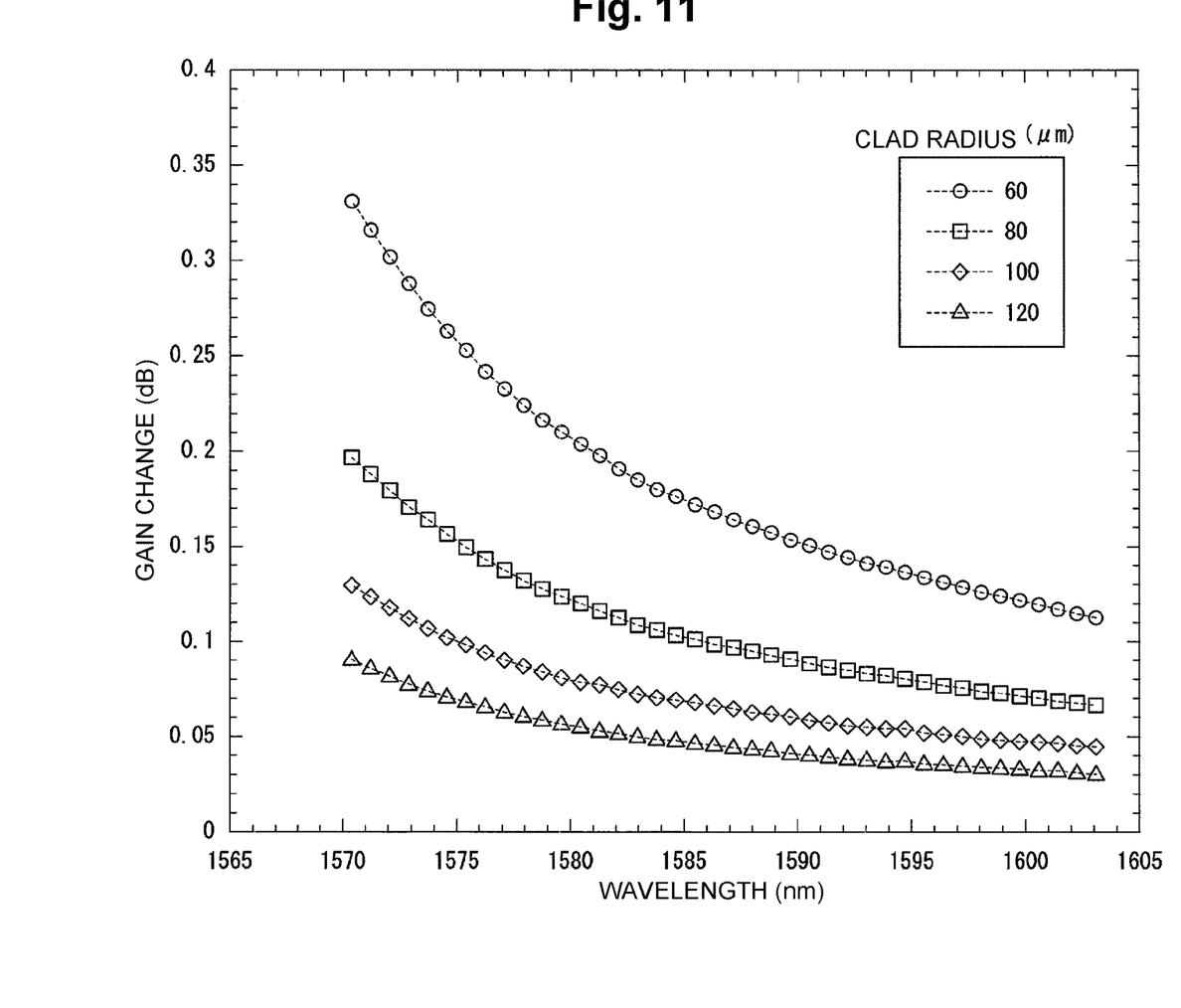
FIG. 11 is a diagram illustrating the gain change of cores in a cladding pumped multicore optical amplifier when the optical node device according to the embodiment is applied to the L range.
Figure 12:
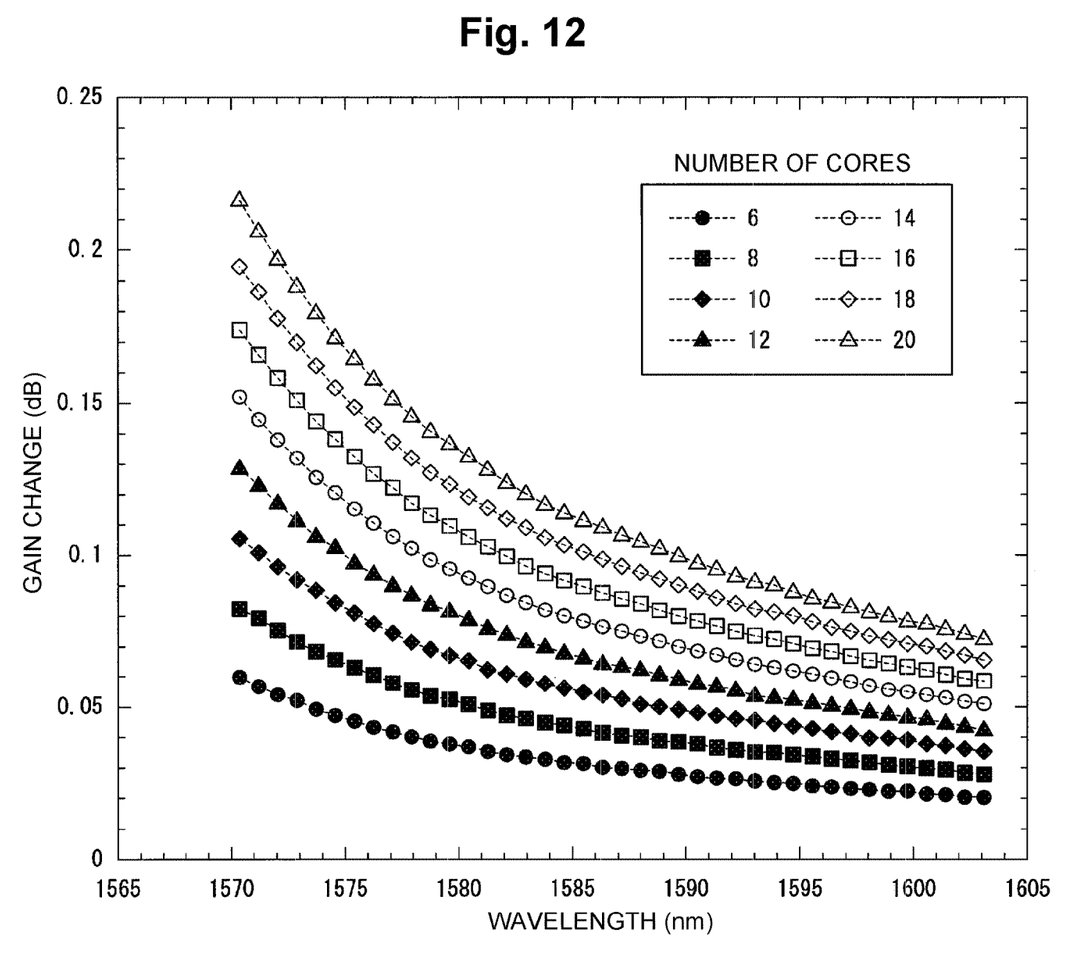
FIG. 12 is a diagram illustrating the gain change of cores in a cladding pumped multicore optical amplifier when the optical node device according to the embodiment is applied to the L range.

FIG. 11 and FIG. 12 each illustrate the gain change, which is similar to that in FIG. 9 and FIG. 10, regarding the cladding pumped multicore optical amplifier 2 when the optical node device 101 according to the present embodiment is used for the L range. FIG. 11 illustrates the inner clad radius dependence of the gain change of the focused core, and FIG. 12 illustrates the core number dependence thereof. FIG. 9 and FIG. 10 indicate that the gain change in either condition is less than 0.1 dB in the C range, and when the gain of a certain core is focused, the influence from the change of the other cores can be ignored. On the other hand, FIG. 11 and FIG. 12 indicate that, in the case of the L range, the gain change is 0.2 dB when the inner clad radius is 80 μm or less and the number of cores is over 18, and there is a large error in the aforementioned control. Thus, it is understood that, in the C range, there is no particular limitation on the inner clad radius or the number of cores in the multicore fiber 21 for the amplification; however, in the case of the L range, the inner clad radius needs to be larger than 80 μm (microns) and the number of cores needs to be 18 or less.

According to the aforementioned embodiment, the optical node device includes the multicore optical amplification unit, the separation unit, the optical cross-connect switch, the plurality of single-core optical amplification units, the output unit, and the control unit. For example, the multicore optical amplification unit is the cladding pumped multicore optical amplifier 2, the separation unit is the fan-out 4-1, the optical cross-connect switch is the cross-connect switch 1, the single-core optical amplification units are the core-pumped single-core optical amplifiers 3-1 to 3-N, the output unit is the fan-out 4-2, and the control unit is the controller 7.

The multicore optical amplification unit includes the multicore fiber, and amplifies collectively light that propagates along the cores in the multicore fiber. The multicore fiber is, for example, a cladding-pumped erbium-doped fiber. The separation unit transmits the light, which has been transmitted along each of the cores in the multicore fiber and amplified, to each of a plurality of input-side single-core fibers. The optical cross-connect switch attenuates individually the light input from the plurality of input-side single-core fibers through an optical attenuator, separates the light in accordance with a wavelength, and outputs the separated light to an output-side single-core fiber of a plurality of output-side single-core fibers related to a respective output destination of the separated light. Each of the plurality of single-core optical amplification units amplifies the light transmitted along each of the plurality of output-side single-core fibers. The output unit outputs the light having transmitted along each of the plurality of output-side single-core fibers and been amplified to each of the plurality of cores in a multicore fiber. The control unit controls the optical attenuator and the single-core optical amplification unit based on the input signal optical power corresponding to optical power before amplification of the multicore optical amplification unit and output optical signal power corresponding to optical power after amplification of the single-core optical amplification unit.

The control unit controls the optical attenuator using an attenuation amount that is calculated based on the input signal optical power and the wavelength number of the light. Alternatively, the control unit may control the optical attenuator using a result of performing correction of a gain tilt on the calculated attenuation amount based on the input signal optical power. In addition, the control unit corrects, based on the input signal optical power, a target gain determined based on the wavelength number, and controls the single-core optical amplification unit based on the corrected target gain, and a gain obtained based on the input signal optical power and the output optical signal power. Alternatively, the control unit may correct the output optical signal power based on the input signal optical power, and control the single-core optical amplification unit based on a gain that is calculated based on the input signal optical power and the corrected output optical signal power, and a target gain determined based on the wavelength number.

The optical cross-connect switch may include a plurality of optical attenuators for the respective input-side single-core fibers, a plurality of input-side wavelength selection switches for the respective optical attenuators, and a plurality of output-side wavelength selection switches for the respective output destinations. For example, the optical attenuators are the variable optical attenuators 11-1 to 11-N, the input-side wavelength selection switches are the wavelength selection switches 12-11 to 12-1N, and the output-side wavelength selection switches are the wavelength selection switches 12-21 to 11-2N. The optical attenuator attenuates the light input from the corresponding input-side single-core fiber. The input-side wavelength selection switch separates the light attenuated by the corresponding optical attenuator for each wavelength, and outputs the separated light to the output-side single-core fiber in accordance with the output destination of the light. The output-side wavelength selection switches multiplex the light input from the plurality of input-side wavelength selection switches, and output the light to the output-side single-core fiber related to the output destination. The control unit regulates the attenuation amount so that the optical power of each wavelength in the input-side wavelength selection switch and the output-side wavelength selection switch become the same.

As described above, the optical node device according to the present embodiment includes the cladding pumped optical amplifier, the core pumped optical amplifier, and the optical cross-connect switch including the variable optical attenuator, and the gain control thereof is performed based on detection values of the input signal optical power and the output optical power of the optical node device. Thus, even if there is a change in the input signal optical power per single wavelength of the optical signal that has been wavelength-multiplexed, the output signal optical power per single wavelength can be controlled to be constant, which is advantageous.

The embodiment of the present invention has been described so far; however, the specific structure is not limited to this embodiment and other designs and the like that do not depart from the concept of the present invention are also included.

REFERENCE SIGNS LIST

1 Cross-connect switch
2 Cladding pumped multicore optical amplifier
3-1 to 3-N Core pumped single-core optical amplifier
4-1 to 4-3 Fan-out
5-1, 5-21 to 5-2N Optical divider
6-11 to 6-1N, 6-21 to 6-2N Optical power detector
7 Controller
11-1 to 11-N Variable optical attenuator
12-11 to 12-1N, 12-21 to 11-2N Wavelength selection switch
21 Multicore fiber
22 Excitation light source
23-1, 23-2 Multiplexer/demultiplexer
31 Single-core fiber
32-1, 32-2 Excitation light source
33-1, 33-2 Multiplexer/demultiplexer
101-1 to 101-M Optical node device
201-11 to 201-1M, 201-21 to 201-2M Transmission multicore fiber.

The invention claimed is:

1. An optical node device comprising:
a multicore optical amplification unit that includes a multicore fiber and amplifies collectively light transmitted along a plurality of cores of the multicore fiber;
a separation unit that inputs, to each of a plurality of input-side single-core fibers, the light transmitted along each of the plurality of cores of the multicore fiber;
an optical cross-connect switch that attenuates individually the light input from each of the plurality of input-side single-core fibers through an optical attenuator, separates the light in accordance with a wavelength, and outputs the separated light to an output-side single-core fiber of a plurality of output-side single-core fibers related to a respective output destination of the separated light;
a plurality of single-core optical amplification units that individually correspond to the plurality of output-side single-core fibers and amplify the light transmitted along the corresponding output-side single-core fibers;
an output unit that outputs the light transmitted along each of the plurality of output-side single-core fibers to each of the plurality of cores in a transmission multicore fiber; and
a control unit that controls the optical attenuator and the single-core optical amplification units based on input signal optical power corresponding to optical power before amplification of the multicore optical amplification unit and output optical signal power corresponding to optical power after amplification of the single-core optical amplification units.

2. The optical node device according to claim 1, wherein the control unit controls the optical attenuator using an attenuation amount that is calculated based on the input signal optical power and a wavelength number of the light.

3. The optical node device according to claim 2, wherein the control unit controls the optical attenuator using a result of performing correction of a gain tilt on the calculated attenuation amount based on the input signal optical power.

4. The optical node device according to claim 1, wherein the control unit corrects, based on the input signal optical power, a target gain determined based on a wavelength number of the light, and controls the single-core optical amplification unit based on the corrected target gain, and a gain obtained based on the input signal optical power and the output optical signal power.

5. The optical node device according to claim 1, wherein the control unit corrects the output optical signal power based on the input signal optical power, and controls the single-core optical amplification unit based on a gain that is calculated based on the input signal optical power and the corrected output optical signal power, and a target gain determined based on a wavelength number of the light.

6. The optical node device according to claim 1, the optical cross-connect switch comprising:
a plurality of the optical attenuators that individually correspond to the plurality of input-side single-core fibers and attenuate the light input from the corresponding input-side single-core fibers;
a plurality of input-side wavelength selection switches that individually correspond to the plurality of optical attenuators, separate the light attenuated by the corresponding optical attenuators for each wavelength, and output the separated light in accordance with output destinations of the light; and
a plurality of output-side wavelength selection switches that individually correspond to the output destinations, multiplex the light output from the plurality of input-side wavelength selection switches in accordance with the corresponding output destinations, and output the light to the output-side single-core fibers related to the output destinations,
wherein the control unit regulates the attenuation amount so that optical powers of wavelengths in the input-side wavelength selection switch and the output-side wavelength selection switch become the same.

7. The optical node device according to claim 1, wherein the light has a wavelength of 1565 nm or more and 1625 nm or less, and
the multicore fiber in the multicore optical amplification unit is a cladding-pumped erbium-doped fiber with an inner clad radius of more than 80 microns and 18 or less cores.

* * * * *